United States Patent [19]
Delen et al.

[11] Patent Number: 5,982,954
[45] Date of Patent: Nov. 9, 1999

[54] OPTICAL FIELD PROPAGATION BETWEEN TILTED OR OFFSET PLANES

[75] Inventors: Nuri Delen; Brian Hooker, both of Boulder, Colo.

[73] Assignee: University Technology Corporation, Boulder, Colo.

[21] Appl. No.: 08/955,084

[22] Filed: Oct. 21, 1997

Related U.S. Application Data

[60] Provisional application No. 60/028,934, Oct. 21, 1996.

[51] Int. Cl.$^6$ ........................................ G06K 9/32
[52] U.S. Cl. ........................................ 382/294; 382/280
[58] Field of Search ........................ 382/293, 295, 382/294, 280, 210, 211; 359/9, 29

[56] References Cited

U.S. PATENT DOCUMENTS

| | | | |
|---|---|---|---|
| 5,155,606 | 10/1992 | Landesman | 359/29 |
| 5,479,257 | 12/1995 | Hashimoto | 382/210 |
| 5,610,733 | 3/1997 | Feldman et al. | 359/9 |
| 5,724,447 | 3/1998 | Fukushima | 382/211 |

OTHER PUBLICATIONS

Bianco, B. and Tommasi, T. (1995), "Space–variant optical interconnection through the use of computer–generated holograms,"Appl. Opt. 34(32):7573–7580.

Louri, A. and Major, M.C. (1995), "Generalized methodology for modeling and simulating optical interconnection networks using diffraction analysis," Appl. Opt. 34(20):4052–4064.

Tommasi, T. and Bianco, B. (1993), "Computer–generated holograms of tilted planes by a spatial frequency approach," J. Opt. Soc. Am. A 10(2):299–305.

Tommasi, T. and Bianco, B. (1992), "Frequency analysis of light diffraction between rotated planes," Opt. Lett. 17(8):556–558.

Frére, C. and Leseberg, D. (1989), "Large objects reconstructed from computer–generated holograms," Appl. Opt. 28(12):2422–2425.

Leseberg, D. and Frère, C. (1988), "Computer–generated holograms of 3–D objects composed of tilted planar segments," Appl. Opt. 27(14):3020–3024.

Rabal, H.J. et al. (1985), "Diffraction by a tilted aperture. Coherent and partially coherent cases," Opt. Act. 32(11):1309–1311.

(List continued on next page.)

*Primary Examiner*—Yon J. Couso
*Attorney, Agent, or Firm*—Greenlee, Winner and Sullivan, P.C.

[57] ABSTRACT

This invention provides a method and apparatus for analyzing the propagation of optical fields between arbitrarily oriented planes using full scalar diffraction theory. One aspect of the invention allows propagation between tilted planes. A second aspect allows propagation between offset planes. To analyze the propagation of an input optical field from a first plane to a second plane, the input field in the spatial domain is Fourier transformed to obtain the plane wave distribution in the spatial frequency domain. Within the spatial frequency domain the field is propagated from the first plane to the second plane by first multiplying the plane wave distribution by the spatial frequency domain phase accumulation between the first and second planes, and then converting the plane wave distribution from the coordinate system of the first plane to that of the second plane. Finally, the propagated plane wave distribution is inverse Fourier transformed to obtain the propagated optical field. This propagation sequence forms the building block for a numerical method to analyze optical systems using full scalar diffraction theory. To analyze optical systems, the input field is propagated from the plane of the source to the plane of the first optical element and the propagated optical field is multiplied by the transmittance function of the optical element. This invention further includes tolerance analysis of each parameter that affects the image quality and coupling efficiency of the optical system.

15 Claims, 6 Drawing Sheets

OTHER PUBLICATIONS

Patorski, K. (1983), "Fraunhofer diffraction patterns of tilted planar objects," Opt. Acta 30(5):673–679.

Ganci, S. (1981), "Fourier diffraction through a tilted slit," Eur. J. Phys. 2:158–160.

Szilas, E.A. and Siegman, A.E. (1975), "Mode calculations in unstable resonators with flowing saturable gain. 2: Fast Fourier transform method," Appl. Opt. 14(8):1874–1889.

Hopkins, H.H. and Yzuel, M.J. (1970), "The computation of diffraction patterns in the presence of aberrations," Opt. Acta 17(3):157–182.

OPTICAL FIELD PROPAGATION BETWEEN TILTED OR OFFSET PLANES

This application claims benefit of provisional application 60/028934, filed Oct. 21, 1996.

BACKGROUND OF THE INVENTION

1. Field of the Invention

This invention relates to a method and apparatus for analyzing the propagation of an optical field between planes that are tilted or offset with respect to each other, and to analysis of optical systems having elements in tilted or offset planes.

2. Background of the Invention

Today, in modeling, the effect of diffraction on the optical field becomes more and more important as the demand for more accurate models increases. Commercial software in general takes two different approaches in dealing with diffraction. Some commercial software takes a geometrical optics approach and takes diffraction into account only artificially by imposing the Frounhoffer diffraction pattern of the pupil on the plane of interest. Some other programs can propagate scalar fields using the Fresnel diffraction approximation. Between parallel planes such programs can use Fast Fourier Transform (FFT) techniques, but when it comes to propagation between tilted planes they resort to numerical integration. Numerical integration for two dimensional problems, depending on the window size, can be very time consuming as compared to a Fourier transform approach.

With the advance of integrated optical systems there is a need to propagate fields between tilted planes, since planes containing the optical elements are defined by the crystal structures in which these integrated optical systems are made. As is the case in silicon based optical integrated circuit technology, most crystal structures can be etched efficiently only in certain crystal directions, and these direction are not necessarily orthogonal to the optical axis of the system. Another reason to have tilted planes in an optical system is to distribute the refractive power of the plane between the optical element and the tilted surface.

Thus it is clear that there is a need to propagate optical fields between tilted planes using scalar diffraction theory both rapidly and accurately. The Rayleigh-Sommerfeld diffraction integral is as accurate as one can get for a scalar treatment. The problem with the Rayleigh-Sommerfeld integral is that when the input and output planes are tilted with respect to each other, one has had to resort to numerical integration since there has not been a way known to use Fourier transform techniques to speed up the calculation.

The problem of tilted planes has been previously treated. Ganci [S. Ganci, Eur. J. Phys. 2:158 (1981)] looked at the specific problem in which a plane wave, tilted with respect to a plane containing a slit, was diffracted onto another plane parallel to the slit plane under the Frounhoffer approximation. Later Patorski [K. Patorski, Optica Acta 30, 673(1983)] further calculated the Frounhoffer intensity pattern of the tilted slit plane on a plane that was perpendicular to the initial plane wave propagation direction. Rabal, Bolognini and Sicre's paper [H. J. Rabal, N. Bolognini, E. E. Sicre, Optica Acta 32, 1309 (1985)] generalized the previously mentioned work and concluded that the intensity pattern due to Frounhoffer diffraction from a tilted plane onto another plane perpendicular to initial beam propagation direction can be calculated by taking the Fourier transform of the tilted plane transmission function in its own coordinate system.

The first paper that addressed the question of finding the diffraction pattern of a tilted plane under the Fresnel approximation came from Leseberg and Frere [D. Leseberg and C. Frere, Applied Optics 27, 3020 (1988)]. Essentially, Leseberg and Frere showed that approach taken by Rabal et al. can be generalized by taking the Fourier transform of the tilted plane phase function times the quadratic phase factor only at spatial frequency components that have a special relation to the spatial coordinates in the output plane, as expressed by Rabal et al. Later Frere and Leseberg suggested another formulation [C. Frere and D. Leseberg, Applied Optics 28, 2422 (1989)] to approximate diffraction patterns of off-axis tilted objects. Finally Tommasi and Bianco proposed a technique [T. Tommasi and B. Bianco, Optics Letters 17, 556 (1992)] to find the relation between the plane wave spectrum of the same field with respect to two coordinate systems only rotated with respect each other, and they used this approach to calculate the computer generated holograms of off-axis objects [T. Tommasi and B. Bianco, J. Opt. Soc. Am. A. 10, 299 (1993)]. Bianco and Tommasi also applied their approach to model space variant optical interconnects [B. Bianco, T. Tommasi, Applied Optics 34, 7573 (1995)].

BRIEF SUMMARY OF THE INVENTION

This invention provides a method and apparatus for analyzing the propagation of optical fields between arbitrarily oriented planes using full scalar diffraction theory. One aspect of the invention allows propagation between tilted planes. A second aspect allows propagation between offset planes. The method utilizes Fourier transforms for high speed calculations.

To analyze the propagation of an input optical field from a first plane to a second plane, the input field in the spatial domain is Fourier transformed to obtain the plane wave distribution in the spatial frequency domain. The plane wave distribution is a set of spatial frequency components with corresponding complex amplitudes. Within the spatial frequency domain the field is propagated from the first plane to the second plane by first multiplying the plane wave distribution by the spatial frequency domain phase accumulation between the first and second planes, and then converting the plane wave distribution from the coordinate system of the first plane to that of the second plane. For the case wherein the second coordinate system is tilted with respect to the first coordinate system the conversion is performed by mapping the complex amplitudes of the spatial frequency components in the first coordinate system to the spatial frequency components in the second coordinate system. For the case wherein the second coordinate system is offset with respect to the first coordinate system, the conversion is performed by multiplying each plane wave complex amplitude by a corresponding phase shift. The conversions for tilted and offset coordinates can be performed separately or in combination, as required by the orientation of the second plane. Finally, the propagated plane wave distribution is inverse Fourier transformed to obtain the propagated optical field.

This propagation sequence forms the building block for a numerical method to analyze optical systems using full scalar diffraction theory. Optical elements such as lenses, diffractive elements, apertures, etc. are characterized by complex amplitude transmittance functions. To analyze optical systems, the input field is propagated from the plane of the source to the plane of the first optical element using the propagation sequence described above. At the second plane, the propagated optical field is multiplied by the transmittance function of the optical element. For a system having a plurality of elements the procedure is repeated and the transmitted optical field from each element serves as the input optical field for the next propagation sequence.

The coupling efficiency of the field into a receptor such as a waveguide, single mode fiber, lens, aperture or detector can be calculated. For coupling into an aperture or detector the output optical field is integrated over the receptor area. For a waveguide, the coupling efficiency can be determined using the overlap integral between the output optical field and the modes supported by the waveguide. This invention further includes tolerance analysis of each parameter that affects the image quality and coupling efficiency. The relevant parameters include the wavelength, the complex amplitude transmittance function, and the distance, tilt and offset of the optical element. The tolerance analysis can be performed by analyzing test cases over the range of parameter distributions. The yield of a manufacturing line with a given set of tolerances can be calculated from the complementary of the cumulative distribution function of efficiencies.

This fast and accurate approach to beam propagation problems is especially applicable to integrated optical circuits, where it is necessary to include diffraction effects, since in integrated optical circuits the optical component apertures are on the order of a couple hundred wavelengths. In addition optical elements in integrated optical circuits are on planes defined by crystal planes, which are not in general 45 or 90 degrees. In this kind of layout one encounters tilted planes and offsets in combination with tilts. The propagation method is also useful in designing off-axis diffractive optical elements where one needs a tool to evaluate the performance and phase function of the diffractive optical element.

BRIEF DESCRIPTION OF THE DRAWING

FIG. 4, comprising

DETAILED DESCRIPTION OF THE INVENTION

The description of this invention is divided into the following sections. In Section 1, Fourier transforming and treating propagation between planes normal to the optical axes are presented. In Section 2, the method of propagating optical fields between tilted planes is presented. In Section 3, a numerical technique is presented to propagate optical fields onto a plane which contains an optical element shifted with respect to previous plane optical axis. In Section 4 computer software based on the scheme outlined this paper is presented. In Section 5, a numerical example is presented in order to demonstrate the method.

1. Treating Propagation Between Planes Normal to the Optical Axis

The fundamental tools for propagating an electromagnetic field are Maxwell's equations. It can be shown that, in an isotropic nonconducting media, the Cartesian components of the fields individually satisfy the wave equation [M. Born and E. Wolf, *Principles of Optics*, $6^{th}$ ed., p. 17, (Pergamon Press, New York, 1980)], $$(\nabla^2 + k^2)U = 0, k = \frac{2\pi}{\lambda}. \tag{1}$$

Figure 1:
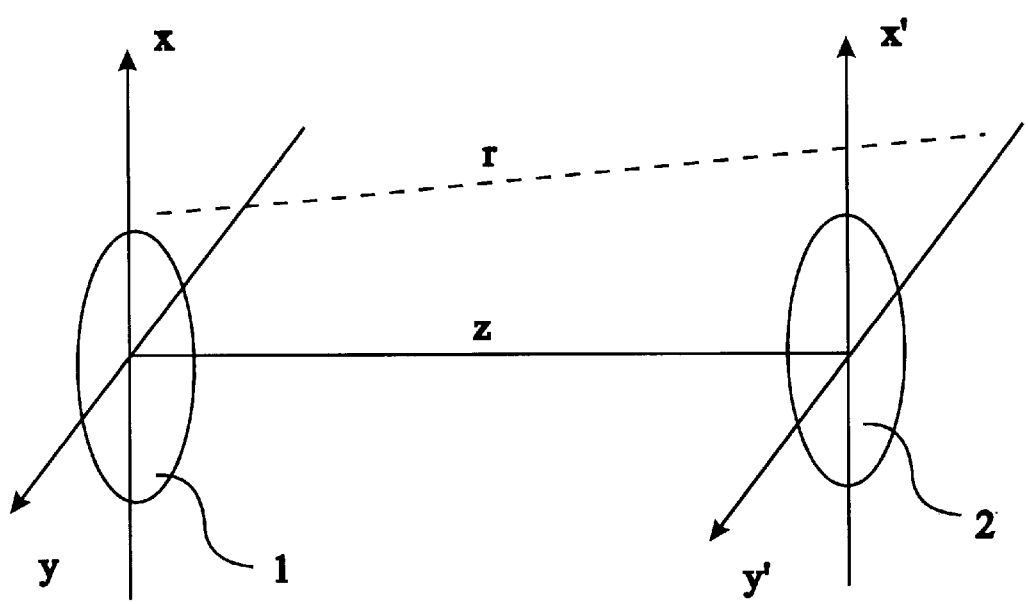
FIG. 1 shows the coordinate systems of a first and second plane.

This expression is for monochromatic light, but not limited to laser light. The Rayleigh-Sommerfeld integral can be derived from the wave equation by using Green's theorem [A. Sommerfeld, *Optics: Lectures on Theoretical Physics*, p. 197, (Academic Press, New York, 1964)]. The Rayleigh-Sommerfeld integral is exact in the limit where the vectorial nature of light can be neglected. The Rayleigh-Sommerfeld integral equation in its full form can be written as, $$U(x', y', z') = \frac{1}{2\pi} \int \int_A U(x, y, 0) \times \frac{\partial}{\partial z}\left(\frac{\exp(-ikr)}{r}\right) dx\, dy \tag{2}$$

or equivalently, $$U(x', y', z') = \frac{1}{2\pi} \int \int_A U(x, y, 0) \times \frac{\exp(-ikr)}{r} \frac{z}{r}\left(ik + \frac{1}{r}\right) dx'\, dy' \tag{3}$$

where $r=[z^2+(x-x^1)^2+(y-y^1)^2]^{1/2}$. The coordinate systems used in Eq. 3 are illustrated in FIG. 1. The integration is over computational window 1 for the previous plane and computational window 2 for the next plane. According to boundary conditions imposed on the problem, regions outside of the aperture do not contribute to the integral.

One important observation about the diffraction integral above is that it is in the form of two function convoluting. One can take advantage of this fact when calculating the diffraction integral numerically. Since the Fourier transform operator is a linear operator, $$U(x', y', z') = \tag{4}$$
$$F^{-1}\{F\{U(x', y'z')\}\} = F^{-1}\left\{F\{U(x, y, 0)\} \times F\left\{\frac{\partial}{\partial z}\left(\frac{\exp(-ikr)}{r}\right)\right\}\right\}$$

where F denotes Fourier transform and $F^{-1}$ inverse Fourier transform.

The analysis method of the present invention starts with Fourier transforming the input optical field in the spatial domain to obtain the plane wave distribution in the spatial frequency domain. This can be performed using $$F\{U(x, y, 0)\} = \tag{5}$$

$$A_0(v_x, v_y, 0) = \iint_\infty U(x, y, 0)\exp[-i2\pi(v_x x + v_y y)]dx dy.$$

$A_0$ is a two dimensional array of complex amplitudes, each complex amplitude representing both an amplitude and a phase. This expression is the full scalar representation without approximations. Approximations such as Fresnel or Frounhoffer approximations can be made but are not necessary. Although the plane wave is expressed as a double integral, in numerical analysis integration is performed by summation and this expression is therefore a sum of plane waves.

The plane wave distribution is propagated from one plane to the next by multiplying it by the spatial frequency domain phase accumulation. The free space propagation transfer function can be used for the phase accumulation [E. Lalor, J. Opt. Soc. Am. 58, 1235 (1968)], as given in Eq. (6):

$$F\left\{\frac{\partial}{\partial z}\left(\frac{\exp(-ikr)}{r}\right)\right\} = \exp\left[-i2\pi\sqrt{\frac{1}{\lambda^2} - v_x^2 - v_y^2}\right]. \tag{6}$$

The left hand side of Eq. (6) is the impulse response function of free space propagation, or putting it in more physical terms, the left hand side of Eq. (6) is the electromagnetic disturbance due to a point source according to scalar diffraction theory. The right hand side is the phase accumulation.

The next step in the propagation of the plane wave distribution is to convert the plane wave distribution from the coordinate system of the first plane to the coordinate system of the second plane, as described in sections 2 and 3 below. Following the conversion, the propagated plane wave is inverse Fourier transformed to obtain the propagated optical field. The inverse transform preferably utilizes the expression $$U(x', y', z') = \iint_\infty A_0(v_x, v_y, 0) \tag{7}$$

$$\exp[i2\pi(v_x x' + v_y y')]\exp\left[-i2\pi z\sqrt{\frac{1}{\lambda^2} - v_x^2 - v_y^2}\right]dv_x v_y$$

where $A_0(v_x, v_y, 0) \exp[i2\pi(v_x x + v_y y)]$ can be interpreted as a plane wave of amplitude $A_0(v_x, v_y, 0)$, having direction cosines $\alpha$ and $\beta$ with x and y axes respectively. In other words, $$\alpha = \sin\theta_x \text{ and } \beta = \sin\theta_y \tag{8}$$

or $$v_x = \frac{\sin\theta_x}{\lambda} \text{ and } v_y = \frac{\sin\theta_y}{\lambda} \tag{9}$$

Figure 2:
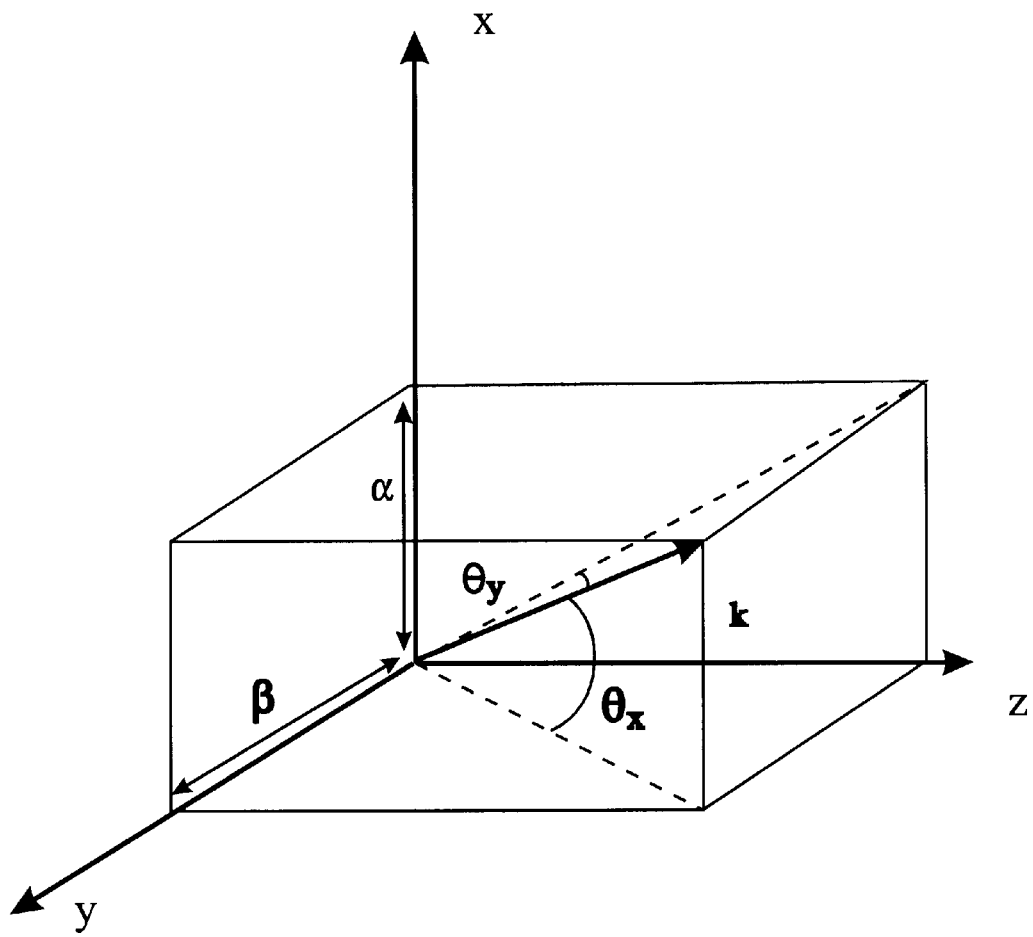
FIG. 2 shows the relationship between k vector direction and spatial frequency components for a particular coordinate system.

The relationship between the k vector direction and the spatial frequency components is illustrated in FIG. 2.

According to Eq. (7) the propagated field is the sum of plane waves originated from the initial plane with different phase delays depending on their angle of propagation. The addition of plane waves takes place on a plane parallel to the initial one. One of the most attractive features of this plane wave decomposition approach is the possibility of implementing fast numerical schemes such as Fast Fourier Transform (FFT), in the calculation of the Rayleigh-Sommerfeld diffraction integral. This allows calculation of the entire propagated field in the same time as calculating only a few field points by using direct integration.

In contrast with previous approaches [J. Goodman, "Introduction to Fourier Optics", chap. 4, (McGraw-Hill, New York, 1968); E. A. Sziklas and A. E. Siegman, Applied Optics 14, 1874 (1975); and W. H. Southwell, J. Opt. Soc. Am. 71, 7 (1981)], Fresnel and Frounhoffer approximations to the square root expression in Eq. (7) need not be employed. There is no need for these approximations as long as one is looking for a numerical solution to the problem. In general, the interesting problems that current optical designs pose require a numerical approach.

2. Treating Propagation Between Planes Tilted With Respect to Each Other

Before inverse transforming according to Eq. 7, the effect of a tilt between successive planes is included in the calculation. The first consideration is the effect of the tilt on the phase accumulation during propagation from the first to the second plane, and the second consideration is how each plane wave component leaving the first (previous) plane is perceived in terms of direction of propagation by the second (next) plane coordinate system.

Figure 3:
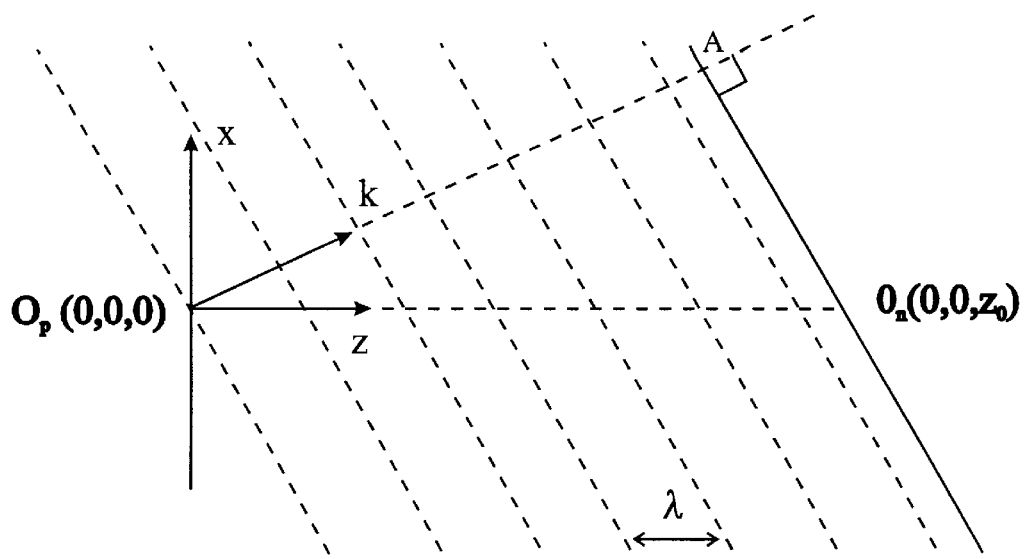
FIG. 3 shows the geometry used for calculating phase accumulation due to propagation between two planes.

Regarding the first consideration, as shown below the phase accumulation due to propagation of a plane wave departed from a previous plane, $$\exp\left[-i2\pi z\sqrt{\frac{1}{\lambda^2} - v_x^2 - v_y^2}\right],$$

is independent of the orientation of the coordinate system of the next plane, as long as the coordinate system origin of the next plane lies on the optical axis, z, defined by the previous plane. In order to see this, consider the situation depicted in FIG. 3. The shortest distance between the previous coordinate system origin, $O_p$, and a plane which crosses the next plane coordinate system origin, $O_n$, and is normal to the plane wave propagation vector k, is shown as $\overline{O_pA}$. From basic calculus, $$\overline{O_pA} = \overline{O_pO_n} \cdot \frac{\vec{k}}{|\vec{k}|} = z_0\vec{e_z} \cdot \frac{k_x\vec{e_x} + k_y\vec{e_y} + k_z\vec{e_z}}{|\vec{k}|} = \frac{z_0 k_z}{|\vec{k}|} \tag{10}$$

In Eq. (10), $e_x, e_y,$ and $e_z$ are the unit vectors in x, y, and z directions respectively. To calculate the phase associated with this distance, the distance is multiplied by $|\vec{k}|$. Since $$k_z = \frac{2\pi}{\lambda}\sqrt{1 - (\lambda v_x)^2 - (\lambda v_y)^2}$$

the phase associated with $\overline{O_pA}$ is $$2\pi z_0 \sqrt{\frac{1}{\lambda^2} - v_x^2 - v_y^2}.$$

Note that this phase is exactly the same as the phase a plane wave accumulates when propagating between two parallel planes [Eq. (7)]. In finding this phase no assumptions were made about the relative orientations of the two planes. The only assumption was that the next plane has a coordinate system origin on the optical axes of the previous plane. Thus when propagating an optical field composed of plane waves onto a plane which is not normal to the optical axes of the previous plane, the phase accumulation term in Eq. (7) does not change as long as the new coordinate system origin is located at the point where the optical axes of the previous plane intersect the next plane. Thus in the analysis the plane wave distribution is multiplied by the phase accumulation independent of tilt between the planes.

Figure 4A:
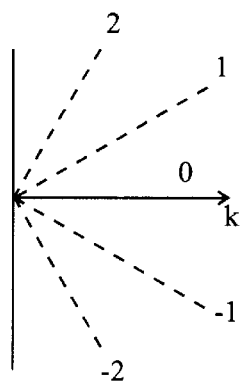
FIGS. 4a–b, shows the spatial frequency components in the (a) first and (b) second coordinate systems.
Figure 4B:
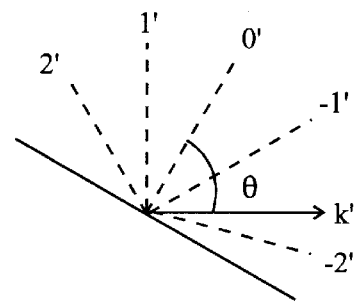

Regarding the second consideration, consider how each of the propagated plane waves are "perceived" by the tilted plane. An example is illustrated in FIG. 4 which shows the dependence of the perceived spatial frequency on the orientation of the coordinate system. In the previous plane, FIG. 4a, the spatial frequency components are 2, 1, 0, −1 and −2 and in the next plane, FIG. 4b, they are 2', 1', 0', −1' and −2'. A plane wave propagating along the optical axes of the previous plane has a spatial frequency of 0, as viewed by the previous plane coordinate system. When it reaches the tilted plane, its angle of propagation with respect to the tilted plane coordinates is −0. In the next coordinate system the new spatial frequency 0' falls between the previous spatial frequency components of 1 and 2. Accordingly the complex amplitude of the new spatial frequency 0' is obtained from the amplitudes of the previous spatial frequency components of 1 and 2, for example by interpolation. Each of the next plane spatial frequency components is assigned to the nearest spatial frequency components in the previous plane, and the amplitudes of the new spatial frequency components are calculated from the amplitudes of the corresponding previous plane spatial frequency components.

This spatial frequency component reassignment can be expressed in a mathematical form. Again consider FIG. 4. Given a spatial frequency in one coordinate system, the corresponding spatial frequency in a coordinate system which is rotated around the y axis is obtained using R. R is the matrix that translates the vector [x,y,z] in the previous coordinate system into a vector [x',y',z'] in the next coordinate system, $$[x', y', z']^T = R[x, y, z]^T, \quad (11)$$

$$\text{then } [v_x, v_y, v_z]^T = R[v'_x, v'_y, v'_z]^T \quad (12)$$

$$\text{where } R = \begin{bmatrix} \cos\varphi & 0 & -\sin\varphi \\ 0 & 1 & 0 \\ \sin\varphi & 0 & \cos\varphi \end{bmatrix}. \quad (13)$$

In Eq. (13) the angle between the optical axes of the previous plane and the next plane is $\varphi$.

One point which should be made about Eq. (12) is that only those plane waves that satisfy $$Im[v_z]=0, \quad v_z>0 \quad (14)$$

can be employed in the mapping and can contribute to the next plane field distribution. The first reason to restrict the mapping by Eq. (12) is that when $Im[v_z]\neq 0$, the plane wave associated with this spatial frequency component will have an exponentially decaying term in front. This exponentially decaying term will prevent the plane wave from propagating more than a few wavelengths without loosing its energy. There is no need to put a restriction like $v_z>0$, since by definition plane wave distribution of the previous plane was generated by taking the Fourier Transform of the previous plane, and it cannot have backward propagating plane waves. The second reason to restrict the mapping by Eq. (12) is that the Poynting vector for a plane wave which has $v'_z<0$, cannot have projection in the direction of the optical axes of the next plane, z'.

For tilted planes, the propagation of the plane wave distribution is thus performed by first multiplying the distribution by the phase accumulation (Eq.(6)), and then mapping the spatial frequency components in the first coordinate to those of the second coordinate as defined by Eqs. (12) and (14). Finally the propagated plane wave distribution is inverse transformed per Eq. (7).

3. Planes With Offset Optical Elements

According to the method outlined in Section 2, the coordinate system of the next plane is centered at the point where the optical axis of the previous plane, z, touches the next plane. However in general, free space beam propagation may include offsets of optical elements (lenses, holograms, fibers, detectors, etc.) with respect to optical axis of the previous plane. For example in free space optical interconnects having two back planes on which there are a number of holograms to steer the beams, it is useful to center the computational window in any of the holograms on the next plane. Offsets can be handled by keeping the computational window big enough such that even offsets cannot prevent covering the interesting part of the field. However this approach is inefficient in the sense that there will be a lot of field points in the computational window which are not very interesting. The present invention provides a computationally efficient and flexible algorithm in which one can offset the coordinate system along with the optical element.

The plane wave distribution is converted from the first to the second coordinate system as follows. Consider Eq. (7) again, which is the addition of plane waves, after propagating them by z and filtering them by Transfer function of free space:

$$U(x, y, z) = \iint_\infty A_0(v_x, v_y, 0) \quad (7)$$

$$\exp\left[-i2\pi z\sqrt{\frac{1}{\lambda^2} - v_x^2 - v_y^2}\right]\exp[i2\pi(v_xx + v_yy)]dv_xv_y.$$

This addition can alternatively take place in an offset coordinate system on the very same plane, for which $$x'=x-x_0 \quad y'=y-y_0 \quad z'=z. \quad (15)$$

Then Eq. (7) becomes, $$U(x', y', z') = \iint_\infty A'_0(v_x, v_y, 0) \quad (16)$$

$$\exp\left[-i2\pi z'\sqrt{\frac{1}{\lambda^2} - v_x^2 - v_y^2}\right]\exp[i2\pi(v_xx' + v_yy')]dv_xv_y$$

where $$A'_0(v_x, v_y, 0) = A_0(v_x, v_y, 0) \times \exp[-i2\pi(v_xx_0 + v_yy_0)]. \quad (17)$$

Therefore, if the second coordinate system is offset with respect to the first, in addition to multiplying the plane wave distribution by the phase accumulation, each plane wave amplitude is multiplied by a phase shift obtained with Eq. (17). The two multiplications can be performed in any order.

This Fourier transform shift is used to move the coordinate origin within a plane in order to better utilize the computational window.

In situations where there is both offset and tilt, the offset is preferably handled last. To analyze the optical field propagation, the input field is written as a sum of plane waves by doing a forward FFT on the input field, Eq. (5), and then each plane wave component is multiplied by the phase factor of Eq. (6). Then, these plane waves are mapped according to Eq. (12). Then the next plane computational window is moved according to Eq. (17) for it to coincide with the center of the optical field or the center of the optical element. Finally the plane waves are added up using an inverse FFT, Eq. (7), in order to get the field on the next plane.

4. Software Implementation of the Analysis Technique

Figure 5:
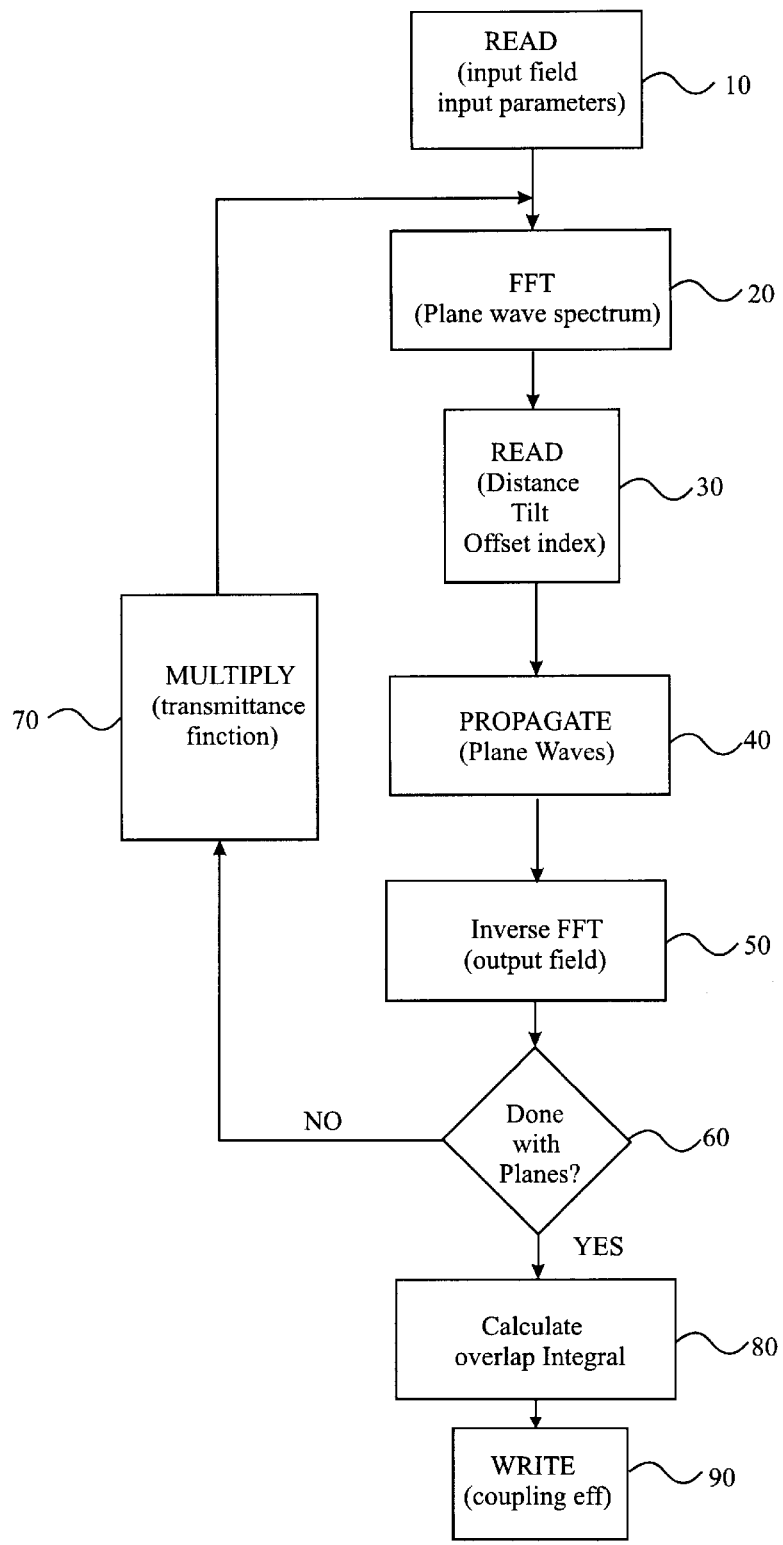
FIG. 5 is a flowchart of the optical system analysis method.

The flow chart for the computational nucleus of the software is shown in FIG. 5. First the computer reads, step 10, the input optical field and input parameters. The propagation of the optical field from the first plane to the second plane is performed by step 20, Fourier transforming the input optical field to obtain the plane wave distribution, step 30, reading the distance, tilt and offset of the second coordinate system, step 40, propagating the plane wave distribution to account for the phase accumulation between the planes and the conversion to tilted or offset coordinates, and step 50, inverse transforming the propagated plane wave distribution to obtain the propagated optical field. If there are more planes through which the optical field is propagated the program loops back, step 60, to the beginning of the propagation sequence. The input field for the next propagation sequence is the propagated optical field from the previous propagation sequence.

To analyze an optical system having optical elements on tilted or offset planes, the propagated optical field is multiplied by a complex amplitude transmittance function, 70. Optical elements such as lenses, diffractive optical elements, apertures etc. have an associated complex amplitude transmittance function. The optical effect of these elements is calculated by multiplying the optical field by these complex transmittance functions to obtain the transmitted optical field. The complex transmittance function is very practical for thin optical elements since the effect of the optical element on the optical field can be handled on one plane with only the minor computational complexity of multiplication. If there are a plurality of optical elements in the system, the propagation and element transmittance steps are repeated, with the transmitted optical field of the previous element being the input optical field for the next propagation sequence.

The coupling efficiency of the transmitted field into a receptor such as a waveguide, single mode fiber, lens, aperture or detector can be calculated. For coupling into an aperture or detector the output optical field is integrated over the receptor area. For a waveguide, the coupling efficiency can be determined using the overlap integral 80 between the output optical field and the modes supported by the waveguide, followed by 90, writing the coupling efficiency.

This invention further includes tolerance analysis of each parameter that affects the image quality and coupling efficiency. The relevant parameters include the wavelength, the complex amplitude transmittance functions, and the distance, tilt and offset of the optical elements. The tolerance analysis can be performed using techniques known in the art. For example, it can be performed by analyzing test cases over the range of parameter distributions. The distributions are determined by factors such as manufacturing tolerances. Each parameter that affects the output is treated as a random variable. The distribution of coupling efficiencies (or image quality) can be calculated by creating thousands of test cases using these parameter distributions. The resultant efficiencies can then be grouped, normalized and plotted. If desired, the efficiency density distribution can be integrated and cumulative distribution efficiencies can then be calculated. The yield of a manufacturing line with given set of tolerances can be calculated from the complementary of the cumulative distribution function of efficiencies.

Numerical implementation of this invention will be clear to those skilled in the art. Preferred techniques are as follows. In order to numerically implement the nucleus of this method, the first issue is the discretization of the problem. In a preferred embodiment, the computational window is sampled by $\lambda/2$. This choice of sample size guarantees that the plane wave spectrum calculated by Eq. (5) consists of plane waves making angles from 90° to −90° with respect to the optical axes, z. A bigger sample size than $\lambda/2$ would eliminate the advantage of full scalar diffraction treatment and the propagation will become paraxial. This fact can be seen by the relation between spatial frequency components and the propagation angles of the plane waves, Eq. (9):

$$v_x = \frac{\sin\theta_x}{\lambda} \text{ and } v_y = \frac{\sin\theta_y}{\lambda}. \tag{9}$$

Consider only the plane waves that have their wave vector, k, on the x-z plane, i.e., $v_y=0$, as shown in FIG. 1. When discretized by the computer, the spatial frequency components have values according to, $$v_x x = \frac{i}{N} j = \frac{i}{\left(\frac{\lambda}{2}\right)N} j\left(\frac{\lambda}{2}\right), i, j = -\frac{N}{2}, \ldots, \frac{N}{2} - 1 \tag{18}$$

where N is the number of samples in x direction and it must be a power of two for FFT implementation of the scheme. According to Eq. (18), with the help of Eq. (9), the spatial frequency component in the x direction can be identified as, $$v_x = \frac{i}{\left(\frac{\lambda}{2}\right)N} = \frac{\sin\theta_x}{\lambda}, i = -\frac{N}{2}, \ldots, \frac{N}{2} - 1. \tag{19}$$

It is clear from Eq. (19) that the extent of plane waves is from 90° to −90° with respect to the optical axes, z.

Another important point in numerically implementing the method is the reassignment (mapping) of frequencies stated in Eq. (12). The left hand side of Eq. (12) is the vector that contains the previous plane spatial frequency coordinates. According to Eq. (19), given the next plane spatial frequency coordinates one can solve the matrix equation in Eq. (12) and find which amplitude and phase of the previous plane spatial frequency coordinate should be assigned to the given next plane spatial frequency coordinate. Since we know the complex amplitude of the previous plane spatial frequency components only at discrete set of points, we can get the complex amplitude that needs to be assigned by an interpolation among the previous plane spatial frequency coordinates. A linear interpolation was found to be enough.

If the interpolation is not done, but instead the closest spatial frequency component complex amplitude is assigned, then due to hard edges in the next plane frequency spectrum, the optical field on the next plane can contain unnecessary tails.

5. A Numerical Example

Figure 6:
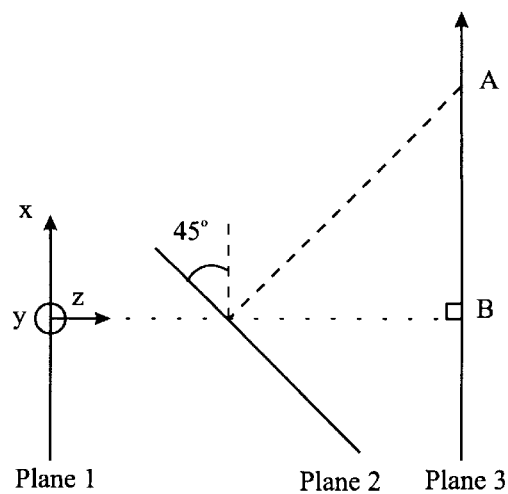
FIG. 6 shows a test system having source Plane 1, intermediate Plane 2 at a 45° angle, and target Plane 3.
Figure 7:
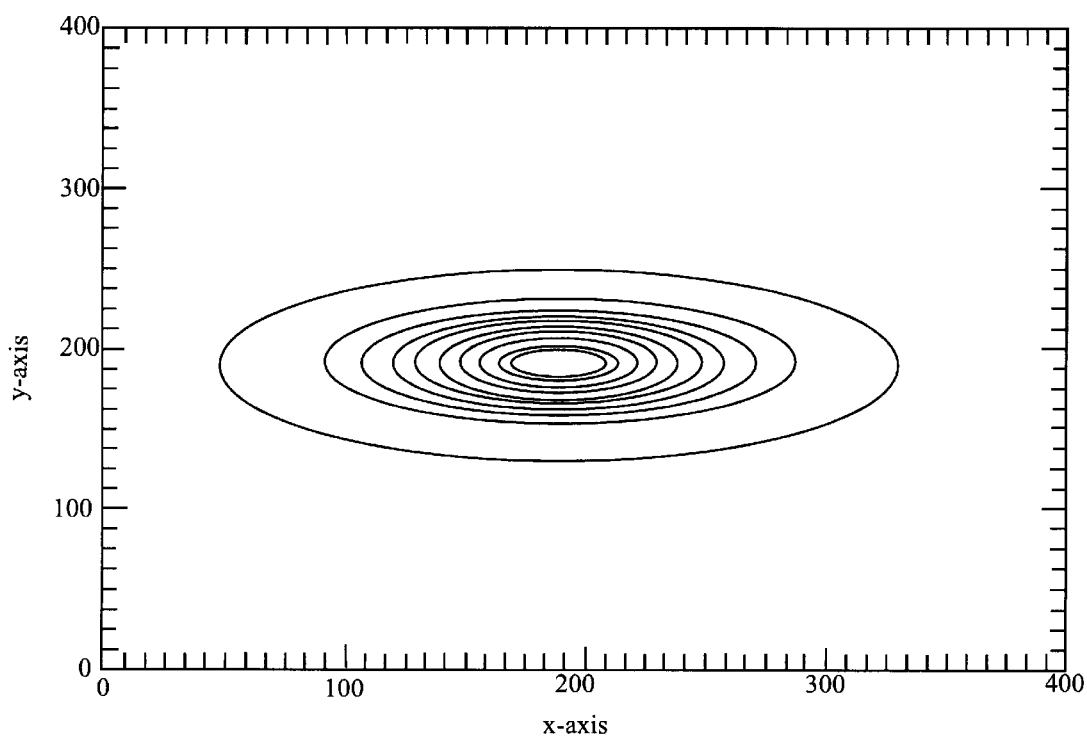
FIG. 7 shows the field on Plane 3 calculated from the field on Plane 1 in one step.
Figure 8:
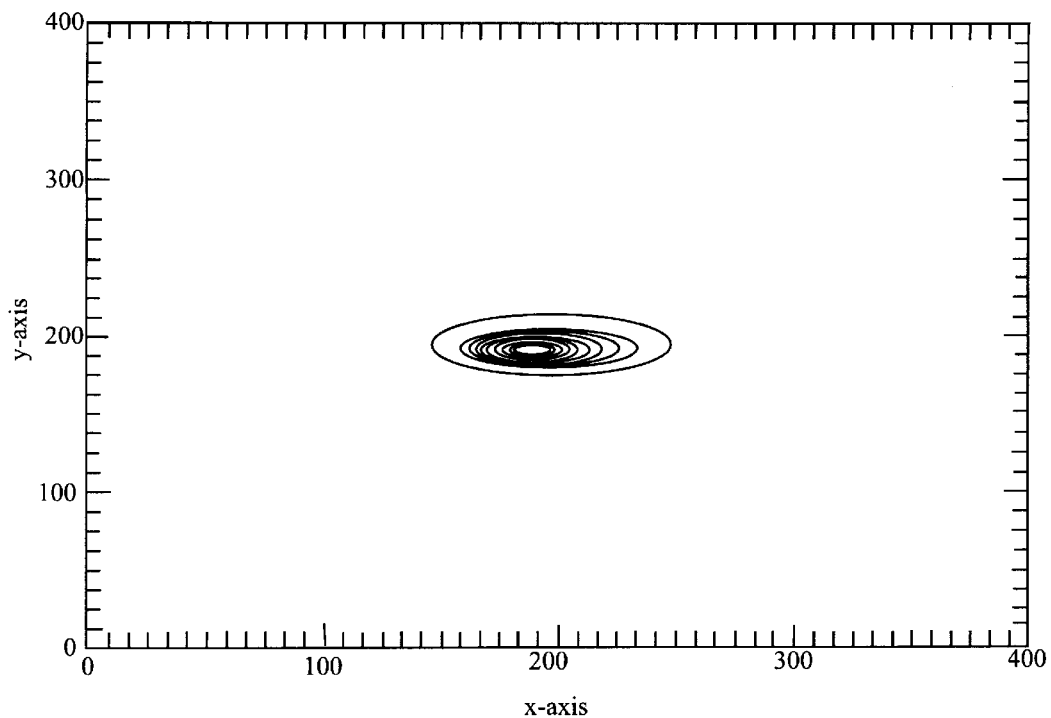
FIG. 8 shows the calculated optical field on intermediate Plane 2.
Figure 9:
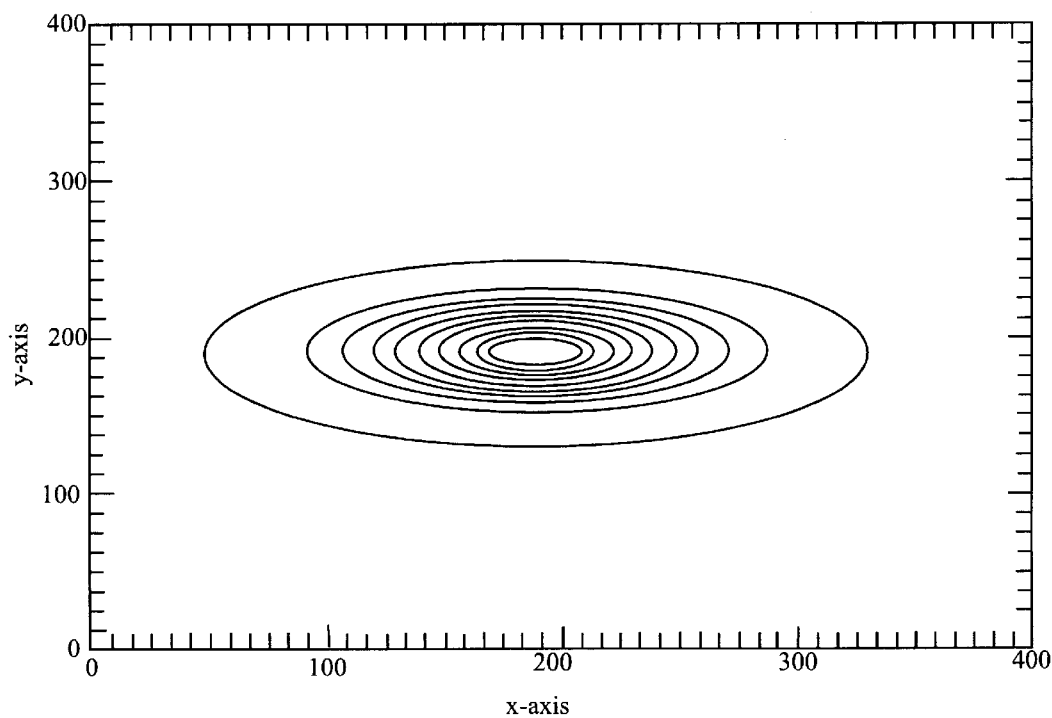
FIG. 9 shows the field on Plane 3 calculated from the intermediate field on Plane 2.

Consider the propagation shown in FIG. 6. On Plane 1 there is a semiconductor laser which has two different divergence angles in two different planes. The far field FWHM intensity divergence angles are 17° degrees and 40.6° on the x-z and y-z planes respectively. The propagation from Plane 1 to Plane 3 was performed in two ways. First, the scalar field leaving Plane 1 was propagated directly to Plane 3 in a single step, to obtain the field shown in FIG. 7. Secondly, the scalar field leaving Plane 1 was propagated onto intermediate Plane 2, to obtain the field shown in FIG. 8, and then the field leaving Plane 2 was propagated onto Plane 3. Since the Plane 2 optical axes cause the field on Plane 3 be centered around Point A, the computational window was shifted using the technique described in Section 3 and the field distribution centered around Point B was calculated, as shown in FIG. 9. As expected, both ways of propagating the field resulted in the same distribution in Plane 3.

We claim:

1. A computer implemented method, for use in the design or evaluation of optical systems, of analyzing the propagation of an optical field from a first plane having a first coordinate system to a second plane having a second coordinate system, said second coordinate system tilted or offset with respect to said first coordinate system, said method comprising the propagation sequence having the steps of:

Fourier transforming the input optical field to obtain the plane wave distribution in the spatial frequency domain, said plane wave distribution being a set of spatial frequency components with corresponding complex amplitudes;

propagating the plane wave distribution from said first plane to said second plane by the steps of:
(1) multiplying said plane wave distribution by the spatial frequency domain phase accumulation between said first and second planes; and
(2) converting said plane wave distribution from said first coordinate system to said second coordinate system; and inverse Fourier transforming the propagated plane wave distribution to obtain the propagated optical field.

2. The method of claim 1 wherein said second coordinate system is tilted with respect to said first coordinate system and wherein said step of converting comprises mapping the complex amplitudes of the spatial frequency components in said first coordinate system to the spatial frequency components in said second coordinate system.

3. The method of claim 1 wherein said second coordinate system is offset with respect to said first coordinate system, and wherein said step of converting comprises multiplying the complex amplitude of each spatial frequency component by a corresponding phase shift.

4. The method of claim 1 wherein said second coordinate system is both tilted and offset with respect to said first coordinate system and wherein said step of converting comprises first mapping the complex amplitudes of the spatial frequency components in said first coordinate system to the spatial frequency components in said second coordinate system and second multiplying the complex amplitude of each spatial frequency component by a corresponding phase shift.

5. A method for analyzing the propagation of an optical field through n planes, comprising the steps of performing the propagation sequence of claim 1 n−1 times, wherein the propagated optical field from the previous propagation sequence is the input optical field for the next propagation sequence.

6. A method of analyzing an optical system having an input optical field in a first plane and an optical element in a second plane, said method comprising the steps of:

analyzing the propagation of said input field from said first plane to said second plane using the propagation sequence of claim 1; and multiplying the propagated optical field by the complex amplitude transmittance function of said optical element, thereby obtaining the transmitted optical field.

7. A method of analyzing an optical system having n optical elements, comprising the steps of performing the method of claim 6 n−1 times, wherein the transmitted optical field of the previous element is the input optical field of the next propagation sequence.

8. The method of claim 7 further including the step of determining the coupling efficiency distribution of the output optical field into a receptor.

9. The method of claim 8 further including the step of performing tolerance analysis of the parameters of said optical elements which affect said coupling efficiency distribution.

10. The method of claim 7 further including the step of determining the image quality of the output optical field.

11. The method of claim 10 further including the step of performing tolerance analysis of the parameters of said optical elements which affect said image quality.

12. A method of building an optical system, having n optical elements, comprising the steps of designing said system, analyzing said system using the method of claim 7, and assembling said optical elements in accordance with the design.

13. The method of claim 12 further including the step of, prior to assembling said elements, revising said design in response to the analysis.

14. A computer having stored in memory a means for analyzing the propagation of an optical field from a first plane having a first coordinate system to a second plane having a second coordinate system, said second coordinate system tilted or offset with respect to said first coordinate system, said means comprising:

a means for Fourier transforming the input optical field to obtain the plane wave distribution in the spatial frequency domain, said plane wave distribution being a set of spatial frequency components with corresponding complex amplitudes;

a means for propagating the plane wave distribution from said first plane to said second plane, said means for propagating comprising:
(1) a means for multiplying said plane wave distribution by the spatial frequency domain phase accumulation between said first and second planes; and
(2) a means for converting said plane wave distribution from said first coordinate system to said second coordinate system; and a means for inverse Fourier transforming the propagated plane wave distribution to obtain the propagated optical field; and a means for displaying said propagated optical field or an indicator of a property thereof.

15. A computer readable storage device having stored thereon a means for analyzing the propagation of an optical field from a first plane having a first coordinate system to a second plane having a second coordinate system, said second coordinate system tilted or offset with respect to said first coordinate system, said means comprising:

a means for Fourier transforming the input optical field to obtain the plane wave distribution in the spatial frequency domain, said plane wave distribution being a set of spatial frequency components with corresponding complex amplitudes;

a means for propagating the plane wave distribution from said first plane to said second plane, said means for propagating comprising:

(1) a means for multiplying said plane wave distribution by the spatial frequency domain phase accumulation between said first and second planes; and (2) a means for converting said plane wave distribution from said first coordinate system to said second coordinate system; and a means for inverse Fourier transforming the propagated plane wave distribution to obtain the propagated optical field.

* * * * *

UNITED STATES PATENT AND TRADEMARK OFFICE
CERTIFICATE OF CORRECTION

PATENT NO. : 5,982,954

DATED : Nov. 9, 1999

INVENTOR(S) : Delen et al.

It is certified that error appears in the above-identified patent and that said Letters Patent is hereby corrected as shown below:

Column 1, line 6, insert

-- This invention was made with government support under AMP contract 153-7760 and ARPA Contract BAA-9346. The Government may have certain rights in the invention.--

Signed and Sealed this

Seventh Day of November, 2000

Attest:

Q. TODD DICKINSON

*Attesting Officer*     *Director of Patents and Trademarks*